Patented Oct. 17, 1939

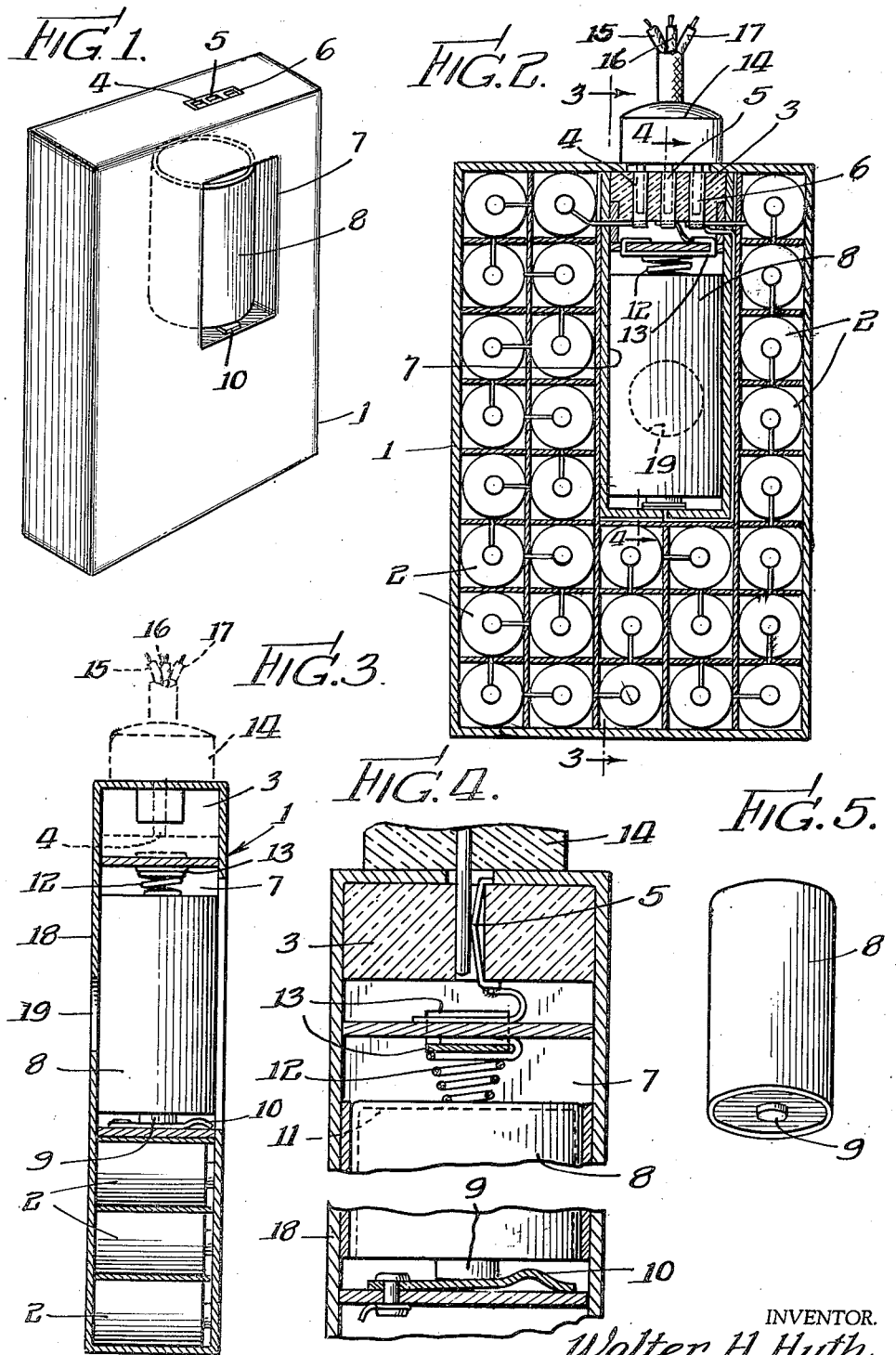

2,176,671

UNITED STATES PATENT OFFICE 2,176,671

A AND B BATTERY COMBINATION

Walter H. Huth, Chicago, Ill., assignor to Aurex Corporation, Chicago, Ill., a corporation of Illinois Application November 9, 1938, Serial No. 239,698

7 Claims. (Cl. 136—109)

This invention relates to batteries, and more particularly to those of the portable kind, such as those made of a size and shape to be carried in the pocket, for use in connection with a portable electric hearing apparatus for deaf people.

Generally stated, the object of the invention is to provide a novel and improved construction and arrangement whereby the so-called A battery and the so-called B battery are organized in a self-contained unit for use in connection with certain kinds of electric hearing apparatus for use by deaf people, of such character that the said A battery, which ordinarily gives out first, may be easily removed and replaced by a new one, the said A battery being mounted upon and supported by the B battery, which latter is ordinarily substantially larger than the former, the said B battery forming a support provided with contacts or electrodes for engaging the ordinary contacts or electrodes of an ordinary A battery, so that a self-contained and compact battery unit is formed, providing an A battery and a B battery, such as those ordinarily used in connection with vacuum tube amplification, for various purposes.

It is also an object to provide certain details and features of construction tending to increase the general efficiency and desirability of a combined A battery and B battery unit of this particular character.

To these and other useful ends, the invention consists in matters hereinafter set forth and claimed and shown in the accompanying drawing, in which—

Fig. 1 is a perspective of a combined A battery and B battery unit embodying the principles of the invention.

Fig. 2 is a vertical section thereof, on a larger scale.

Fig. 3 is a vertical transverse section on line 3—3 in Fig. 2 of the drawing.

Fig. 4 is a fragmentary sectional view, on a still larger scale, and showing certain details of the contacts or electrodes of the unit, being a transverse section on line 4—4 in Fig. 2 of the drawing.

Fig. 5 is a perspective of the A battery shown removed from its compartment or space in the supporting body formed by the B battery.

As thus illustrated, the invention comprises a suitable casing 1, of any suitable or desired material, formed therein with compartments for the cells 2, connected in series to form the B battery. It will be seen that the top of the rectangular body thus formed has a block of insulation 3 rigidly mounted therein, with three metal contacts or electrodes 4, 5 and 6, mounted in three sockets formed in said block. One terminal of the series arrangement of the cells of the B battery is connected to the electrode 4, while the other terminal thereof is connected to the electrode 6.

Below the said block 3, there is a compartment 7 for the single cell or A battery 8, which latter is disposed upright therein. The lower end of said A battery has an electrode 9 that engages the spring contact 10 on the bottom of the said compartment 7, this spring being connected by a suitable conductor with the previously mentioned electrode 6 at the top of the unit. The other electrode in the form of a flat wall 11 engages the yielding coil spring 12 that is united with the metal element 13, which is in turn connected by a suitable conductor with the middle electrode 5 previously mentioned.

With the combined A battery and B battery unit thus constructed, a plug 14 is preferably provided, having three prongs for insertion in the three sockets in the block 3, for engagement respectively with the electrodes 4, 5 and 6, suitably held in these sockets, and the three prongs of this push-in plug are connected, respectively, with the three conductors 15, 16 and 17, of a suitable or flexible cord leading to the desired instrument, such as some portion of the electrical hearing apparatus which a deaf person may carry, in any suitable or well known manner, while the battery unit thus provided may be carried in a pocket of the clothes of said person.

Ordinarily, as is well known in radio work, or in connection with other apparatus using vacuum tube amplification in conjunction with ordinary primary or dry batteries, the so-called A battery usually gives out first, and ordinarily has to be replaced several times before the B battery gives out. With the construction shown and described, the A battery and the B battery are not only combined in a compact form, in a sort of self-contained unit, with a single cord leading therefrom, but in addition said A battery is mounted in or upon and supported by the B battery in such a manner that a symmetrical and a compact unit is obtained, which can be carried in the pocket, and in which the said A battery can be readily renewed and replaced by a new one. The outside surface or jacket of the battery unit thus provided may be of any suitable or desired material, but is preferably of some waterproof material of good appearance. The casing can be made of metal or fiber or plastic, of one kind or another, and covered with leather or other sheet material, in order to insure both waterproof and good wearing qualities, as well as attractive appearance.

For convenience, the back wall 18 of the compartment 7 is preferably provided with a relatively small hole 19 through which the finger may be inserted to push out the A battery, when the latter has given out, it being observed that the front of this compartment 7 is preferably left open for the full area thereof, which means for the full height and width of this compartment, so that a new A battery can be pushed into place through the front of the compartment and may be expelled from the opposite direction.

It will be seen that the round cells of the B battery are disposed with their axes parallel, at right angles to the general thickness of the body of the unit, while the round cell of the A battery is disposed with its axis extending at right angles to the axes of the cells of the B battery. The unit is therefore substantially flat, with practically flush sides, as the diameter of the A battery cell 8 is substantially the same as the axial dimension or length of the round cells of the B battery. But the diameter of the A battery cell 8 is substantially greater than that of the B battery cells.

Any suitable or desired means, of course, can be employed for detachably holding the A battery cell 8 in the position in the structural unit shown and described. Preferably, however, the spring electrode 10 is formed, as shown in Fig. 4, to engage the battery electrode 9, and with this spring co-operating with the spring 12, the battery is detachably held in place against accidental separation from the unit, but can be forced out by pressure exerted through the hole 19, in the manner previously described.

Thus the battey cells 2 constitute a multiple cell battery that constitutes the substantially solid or rigid body of the entire unit, and the chamber 7 is formed within the cellular area of this battery, and within the three dimensions of said body, for the latter has both length and breadth and thickness, and the said chamber is entirely within the said three dimensions.

Of course, as is well known, the A battery is of relatively short life, as compared with the B battery, and hence the latter can be used one or more times with a new A battery, all in a self-contained unit. In this way the B battery does not have to be thrown away when the A battery is exhausted, as the latter can be removed and replaced by a new one. Thus the single cell battery 8 is entirely within the cellular area of the multicell or B battery, the latter being of relatively high voltage, while the A battery is of relatively low voltage. The single cell 8, therefore, is entirely within the three dimensions of the body formed by the multi-cellular B battery. But the whole thing is combined in a flat and rectangular unit which can easily be used in places where an ordinary or more bulky structure could not be employed.

What I claim as my invention is:

1. A combined high and low voltage battery unit, comprising a multiple cell battery forming the substantially solid and rigid body of said unit, for current of relatively high voltage, having a casing enclosing the cells thereof, and a battery removably disposed within said body, in a chamber formed within the cellular area thereof, for current of relatively low voltage, whereby said relatively low voltage battery is entirely within the three dimensions, length, breadth and thickness, of said relatively high voltage battery, said other battery being readily removable and replaceable through an open side of said chamber.

2. A structure as specified in claim 1, said low voltage battery comprising a single upright cell, of relatively large size, and the cells of said high voltage battery being of smaller size and being horizontal when the unit is upright.

3. A structure as specified in claim 1, said chamber having spring means for releasably and electrically engaging said low voltage battery.

4. A structure as specified in claim 1, having a separable three electrode connection for the top of the unit, with two of the electrodes in one battery circuit, and two in the other battery circuit, so that one electrode is in both circuits.

5. A structure as specified in claim 1, the other side of said chamber having a finger opening in said casing through which to push out said low voltage battery.

6. A structure as specified in claim 1, said body having a separate compartment for each cell of the high voltage battery.

7. A structure as specified in claim 1, the casing walls engaging the ends of the cells of the high voltage battery, the casing having walls presented to the cylindrical side surface of the low voltage battery.

WALTER H. HUTH.